United States Patent [19]

Holt et al.

[11] Patent Number: 5,960,447

[45] Date of Patent: *Sep. 28, 1999

[54] WORD TAGGING AND EDITING SYSTEM FOR SPEECH RECOGNITION

[76] Inventors: Douglas Holt, 4819 E. Western Star Blvd., Phoenix, Ariz. 85044-1222; Michael K Davis, 5808 E. Turquoise Ave., Paradise Valley, Ariz. 85253-1128; Joseph H Miglietta, 10137 E. Conieson Rd., Scottsdale, Ariz. 85260-9206

[ * ] Notice: This patent issued on a continued prosecution application filed under 37 CFR 1.53(d), and is subject to the twenty year patent term provisions of 35 U.S.C. 154(a)(2).

[21] Appl. No.: 08/556,077

[22] Filed: Nov. 13, 1995

[51] Int. Cl.[6] .................................................. G06F 17/21
[52] U.S. Cl. ........................ 707/500; 704/235; 704/270
[58] Field of Search .................................... 395/762, 777, 395/802, 793, 2.44, 2.6, 2.87; 707/501, 515, 531, 513; 345/302; 704/235, 270

[56] References Cited

U.S. PATENT DOCUMENTS

| | | | |
|---|---|---|---|
| 4,829,576 | 5/1989 | Porter | 395/2.44 |
| 4,914,704 | 4/1990 | Cole et al. | 395/2.44 |
| 5,031,113 | 7/1991 | Hollerbauer | 395/2.44 |
| 5,220,611 | 6/1993 | Nakamura et al. | 395/2.87 |
| 5,355,472 | 10/1994 | Lewis | 395/612 |
| 5,572,643 | 11/1996 | Judson | 395/793 |
| 5,799,273 | 8/1998 | Mitchell et al. | |

OTHER PUBLICATIONS

"Digital Dictate; Making Computer Voice Dictation Usable", NCC Incorporated brochure, Nov. 13, 1994.

Banet, Bernard, "Dictation Systems for Windows: Dragon, IBM, Kurzweil", The Seybold Report on Desktop Publishing, vol. 9, No. 10, pp. 3–11, Jun. 10, 1995.

"Software package enhances IBM VoideType dictation", Speech Recognition Update, Apr. 1995, pp. 1–2.

"Science Fiction Becomes Reality as NCC's 'Digital Dictate' (TM) Instantly Transforms the Spoken Word into Accurate Text", News Advisory from PR Newswire Los Angeles, Jan. 5, 1995.

*Primary Examiner*—Joseph H. Feild
*Attorney, Agent, or Firm*—Oppedahl & Larson LLP

[57] ABSTRACT

A word tagging and editing system for speech recognition receives recognized speech text from a speech recognition engine, and creates tagging information that follows the speech text as it is received by a word processing program or other program. The body of text to be edited in connection with the word processing program may be selected and cut and pasted and otherwise manipulated, and the tags follow the speech text. A word may be selected by a user, and the tag information used to point to a sound bite within the audio data file created initially by the speech recognition engine. The sound bite may be replayed to the user through a speaker. The practical results include that the user may confirm the correctness of a particular recognized word, in real time whilst editing text in the word processor. If the recognition is manually corrected, the correction information may be supplied to the engine for use in updating a user profile for the user who dictated the audio that was recognized. Particular tagging approaches are employed depending on the particular word processor being used.

42 Claims, 9 Drawing Sheets

WORD TAGGING AND EDITING SYSTEM FOR SPEECH RECOGNITION

The invention relates generally to text editing in connection with speech recognition, and relates particularly to text editing in which text words are tagged with information that permits ready retrieval of sound bites whilst editing by means of a conventional word processor.

BACKGROUND

Much attention has been paid in recent years to the problem that many people cannot or will not type. Enormous efforts have been expended to attempt to remedy this problem, efforts relating to the user interface (e.g. the widespread adaptation of rodent-oriented graphical user interfaces) and relating to data entry (e.g. speech recognition and handwriting recognition). Speech recognition has developed to the point that off-the-shelf audio hardware can be used with off-the-shelf speech recognition engines to supply recognized text to other applications such as word processor programs.

As anyone who has used a speech recognition engine will report, the engine doesn't do as well as the human ears, audio cortex, and brain in recognition of speech. Humans have little difficulty processing distinct words even if the words are spoken in continuous fashion (as is usually the case), whilst the commercially available recognition engines have a very difficult time unless the user is trained to speak with pauses between words. Humans have little difficulty understanding the speech of a multitude of different speakers across a wide vocabulary, and in contrast most speech recognition engines do well only if the vocabulary is greatly constrained or if the range of permitted speakers is greatly constrained.

In the face of all this, it is clear that the application using the recognized text must necessarily have some mechanism according to which the user can correct mis-recognized words. A spelling checker is of no help, of course, because the words from the engine generally are correctly spelled words. In most systems in which a speech recognition engine and word processor are used, the method of correction is simple: the user reads the text in the word processor, performs a mental review of the words, and corrects words that were incorrectly recognized. The mental steps employed by the user include checking each word for consistency of grammar and meaning with respect to its neighboring words. In addition, if the person doing the editing correction happens to be the same as the person who dictated the original recognized audio, then the user may be able to refer to the user's recollection of what was said to assist in correcting mis-recognized words. Similarly if the person doing the editing correction was present during the original dictation or has other independent knowledge of what was said, then the user may be able to refer to the user's recollection or knowledge to assist in correcting mis-recognized words.

Depending on the particular speech recognition engine used, when the dictated word is recognized by the speech engine it contains specific information about the recognized word, including context, the word spelling, the audio associated with the word, confidence levels or scores, as well as additional information about the recognized word that the engine may generate. Regrettably very little of this information is put to full use by the time the user is editing the text in a word processor or other application. There is thus a great need for improved ways of editing and correcting the text that results from speech recognition.

SUMMARY OF THE INVENTION

A word tagging and editing system for speech recognition receives recognized speech text from a speech recognition engine, and creates tagging information that follows the speech text as it is received by a word processing program or any program. The body of text to be edited in connection with the word processing program may be selected and cut and pasted and otherwise manipulated, and the tags follow the speech text. A word may be selected by a user, and the tag information used to point to a sound bite within the audio data file created initially by the speech recognition engine. The sound bite may be replayed to the user through a speaker. The practical results include that the user may confirm the correctness of a particular recognized word, in real time whilst editing text in the word processor. If the recognition is manually corrected, the correction information may be supplied to the engine for use in updating a user profile for the user who dictated the audio that was recognized. Particular tagging approaches are employed depending on the particular word processor being used.

DETAILED DESCRIPTION

Figure 1:
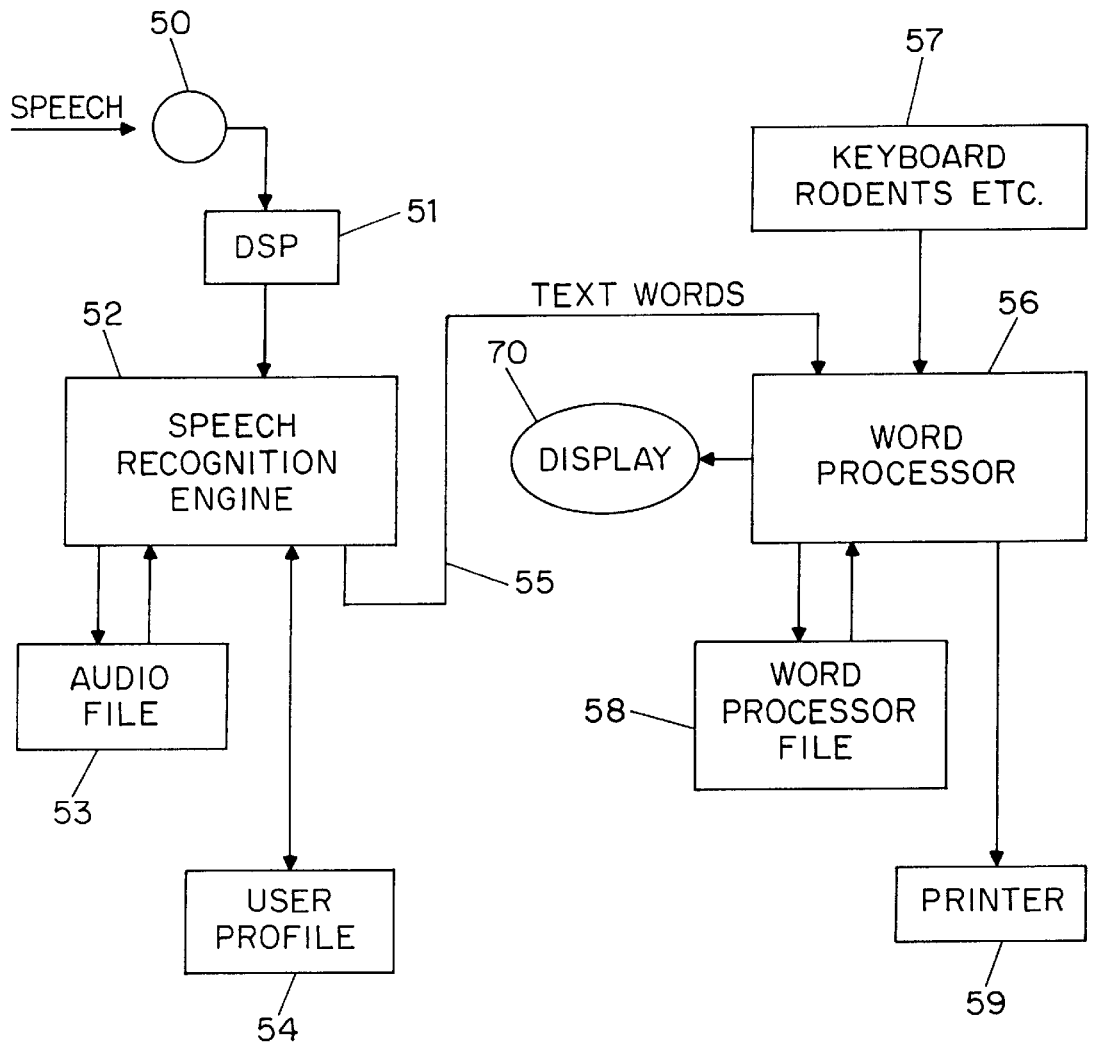
FIG. 1 shows in functional block diagram and data-flow fashion a typical prior art system using a speech recognition engine and a word processor.

FIG. 1 shows a prior-art arrangement for speech recognition and editing. Speech is received at microphone 50 and processed by well-known digital signal processor DSP 51. It should be understood that while at present the DSP is thought to be the preferable arrangement, increases in processor bandwidth and speed might make it preferable to use an analog-to-digital convertor and to do all the signal processing in the main processor. The output of the DEEP is provided to the speech recognition engine 52. The engine 52 writes an audio file 53 which contains audio information from the DSP 51. In many engines a user profile file 54 is used, specific to the particular speaker whose speech is being recognized. The user profile 54 contains information relating to the particular speaker, accumulated over time as that particular user's speech is recognized and corrected. When the speech recognition is performed, text words are developed. The text words are communicated via data flow line 55 to a word processor 56, typically handled in software in much the same way that hand-typed user entries are handled. The user controls the software by means of user input devices 57 including a keyboard, a mouse, a trickball, and any of a variety of other rodents and other pointing devices. The text is stored in a word processor file 58, and is edited and manipulated. A display screen 70 permits the user to see the edited document. The results of the editing are optionally printed at printer 59 or communicated to other equipment by means of communications links omitted for clarity in FIG. 1.

Those skilled in the art will appreciate that speech recognition engines are commonplace. One commonly employed speech recognition engine is the IBM VoiceType recognition engine. Applications receiving recognized text are also commonplace. Commonly employed applications include word processors such as Microsoft Word, WordPerfect, Ami Pro, and other applications such as Microsoft Access and spreadsheet applications. As will be clear from the discussion that follows, the invention is not tied to any particular recognition engine nor to any particular word processor or other application, but offers its benefits generally across recognition engines and text-receiving applications. In this context, the general term "word processor" should be understood to refer to text-receiving applications generally where the benefits of the invention are enjoyed, including command/control of physical systems.

A difficulty with the prior art system of FIG. 1, as discussed above, is that if a user is operating the word processor 56 and happens upon a word that is suspected of having been recognized incorrectly, the user must rely on contextual cues, memory, or other consistency checks to select a corrected word to be inserted in place of the incorrect word. If and when the correction is done there is generally no mechanism whereby the correction can contribute to user profile information to assist in future speech recognition.

Figure 2:
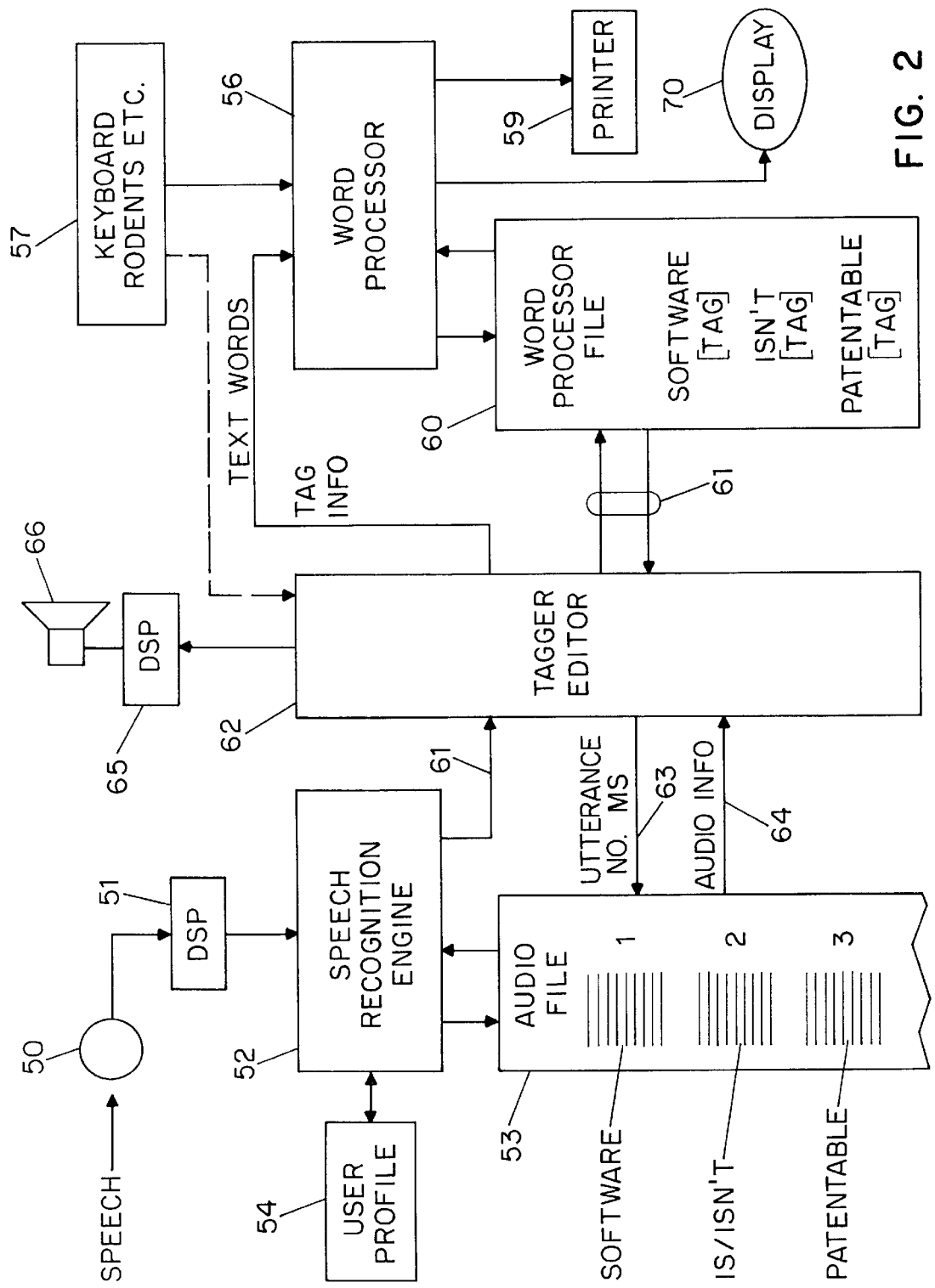
FIG. 2 shows in functional block diagram and data-flow fashion a system using a speech recognition engine and a word processor together with tagging and editing capabilities according to the invention.

Turning now to FIG. 2 there is shown an embodiment of a speech recognition and editing system according to the invention. Many parts of the system are as shown in prior art FIG. 1, but some differences will now be described and others discussed below. A tagger editor 62 is provided which receives word text and related information as shown by line 61. The word text and related information represents a cluster of data or information which needs to be linked in some manner with the word/text/data as it is put into an external application/system/process such a word processor 56.

As will be discussed further below, the word processor file 60 according to this embodiment of the invention contains not only the text words (e.g. "software isn't patentable") but also tag information. The tag information in an exemplary embodiment includes a time code (measured in milliseconds from an origin) pointing to a particular starting point in the audio file 53, an utterance number identifying a particular recognized word, and information indicative of the duration of the utterance. The tag information is stored in the word processor file 60 and, quite importantly, is stored in a way that (1) is concealed from the user and (2) follows the text if it is cut or copied or pasted using the standard editing features of the word processor or other application. The user can select an item of text and provide a user input asking that it be "replayed", and again quite importantly the system finds the sound bite within the audio file 53 corresponding to the selected item, and replays it over the speaker 66. These functionalities fulfill a long-felt need (extending for the entirety of the past twenty years during which many investigators have attempted to improve upon speech recognition systems) for an ability to edit, revise, and correct recognized text using all possible available information to disambiguate or otherwise rectify recognition errors. In the case where the recognition engine 52 yields alternate possible words for an utterance, it is possible to retrieve and view the alternates to permit the user to select among the alternates, a functionality discussed in more detail in connection with FIG. 4.

The benefits, stated in different terms, can include:
playback of associated audio for each recognized word (helpful for correction and proof reading of text/data from the recognition engine 52);
updating the user profile 54 (or equivalent information for a specific engine, necessary for the recognition technology to improve recognition accuracy in future dictation sessions); and
accessing information about the recognized word and alternate words found by the recognition engine 52.

Prior to this invention, it was not possible for an external application such as a word processor 56 to associate the necessary information to obtain these benefits. Particularly, if the text/data information generated by the recognition technology was moved within an external application it could not have access to the basic benefits of the recognition technology.

Figure 6:
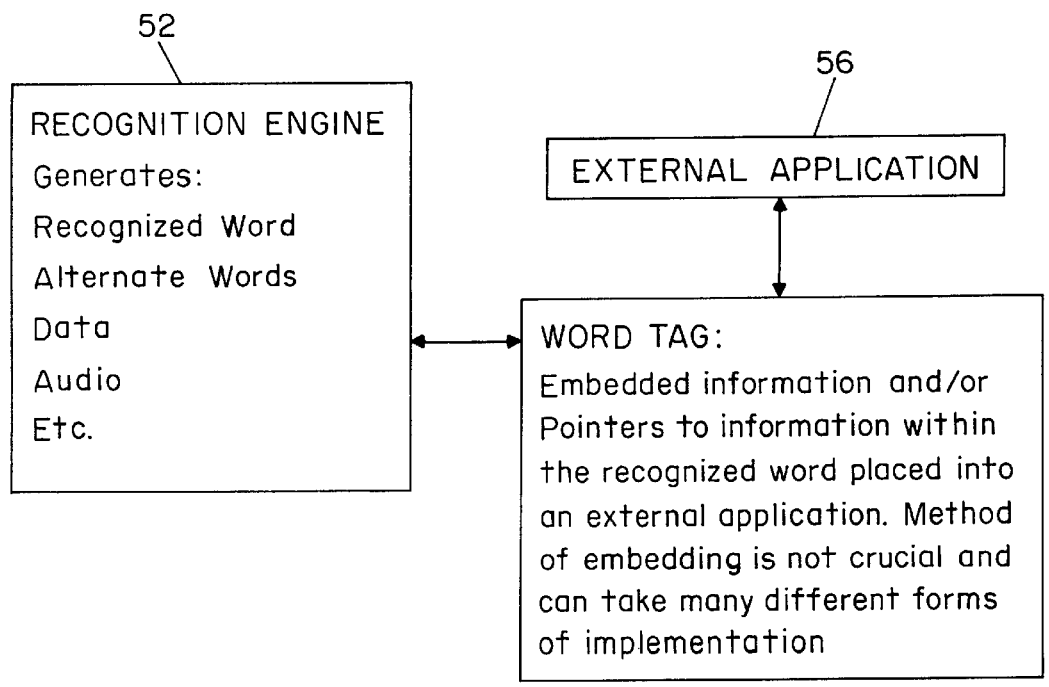
FIG. 6 shows operative connections between a recognition engine, an external application, and a word tagging functionality according to the invention, all shown in functional block diagram form.

In the system according to the invention, text/data from the recognition engine 52 can be embedded internally into the recognized word that is placed into an external application 56. The embedded information can be text, data, pointers or any information generated by the recognition engine. This is shown diagrammatically in FIG. 6.

The information from the recognition engine 52 will now be described in more detail. In the case of the IBM recognition engine, the resulting information is referred to as a "tag". The tag is basically (1) a milliseconds index or time code pointing into a "PCM" audio file, (2) a unique identifier, and (3) an utterance number. This information allows an application utilizing the word tag invention to make speech API calls which allow the application using this invention (e.g. the word processor) the full benefit of all capabilities of a speech recognition engine.

If other commonly used speech recognition engines are used, the tagging may be different. For some engines each dictated word may be split up into a distinct audio file in which case the tag includes file name information.

Figure 4:
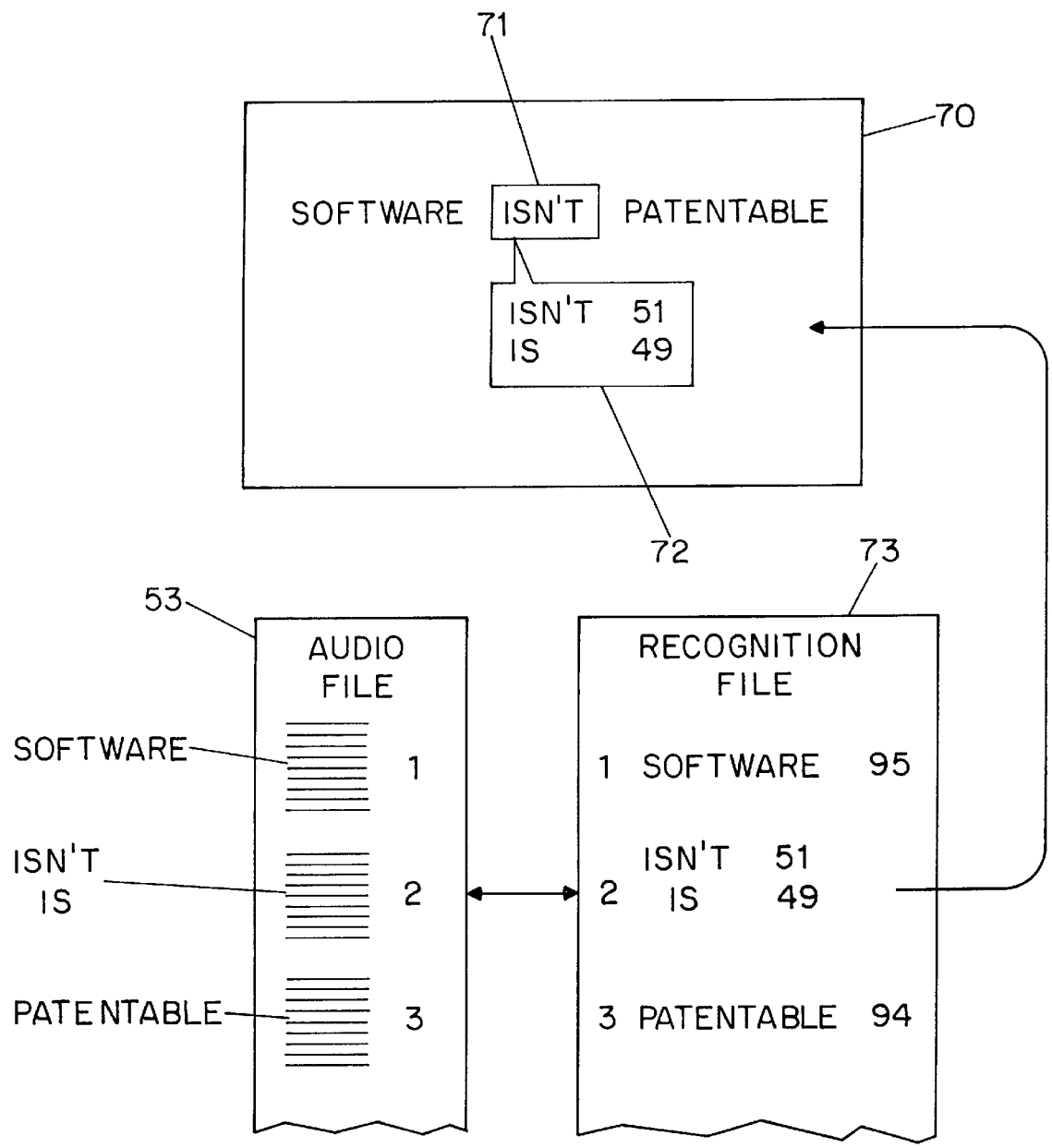
FIG. 4 shows a typical word processor screen juxtaposed with audio files and related speech recognition files.

Even if a particular engine did not supply audio information for playback, it still may provide useful information that can be retrieved with tags as described in connection with the invention. For example, if the engine supplies not only its "best guess" of the recognized word, but also alternative word information, this invention could maintain the alternate-words information with a recognized word for correction and proof reading purposes. As shown in FIG. 4 and discussed in more detail below, the user may select a word 71, and the system displays the alternative words 72 together with their confidence values. This information is drawn from the recognition file 73 and, if requested by the user, the system also draws upon audio data in the audio file 53.

It should also be mentioned at this point that while the invention is being described in the context of a text word, the benefits of the invention present themselves if the recognized utterance is depicted in forms other than text words. For example, the tag information could be associated with any graphic element or form of data, so long as the tag contains information from the engine, that points back to the information generated from the engine (e.g. in file 53). Typically this is done by an index into an array of information such as file 53 or an array of structures of information.

The index or tagging information is stored in whatever means is available to the actual application 56. The system according to the invention looks at the information contained within the hidden tag associated with the dictated word and is able to use that index to point back to the original data source that generated that word.

Experience has shown that several criteria must be satisfied for the system according to the invention to fulfil its promise. The criteria will be discussed in turn.

A first criterion is that the cursor placement relative to the space before and after the dictated word/units, and typed text that is not placed directly inside the dictated word, must all be kept from ending up inside the tag for the dictated word. A second criterion is that during a standard Windows-type cut, paste and copy implementation where the information is placed into the clipboard, the associated tag or index must go along with the new text that is cult or copied. In the case of Microsoft Word, for example, the tag is a bookmark, and the bookmark must go with the actual text that was cut or copied and subsequently pasted into a new location within that document or another document. This criterion is crucial for the ability to cut or move dictated text around within a document or another document and still maintain the ability to have the sound continue to be associated with that dictated text. Such a preserved association is important for correction and proof reading purposes and also for the ability to move text around and maintain the ability to create and update the user profile relative to the recognition process so that the recognition engine can learn words that are mis-recognized and subsequently corrected. Stating this different, it is important that all methods must allow the word tag information to be associated with the text even when it is placed into the clipboard or an equivalent method used for moving text around within a document/application/system or other documents/applications/systems.

Figure 7:
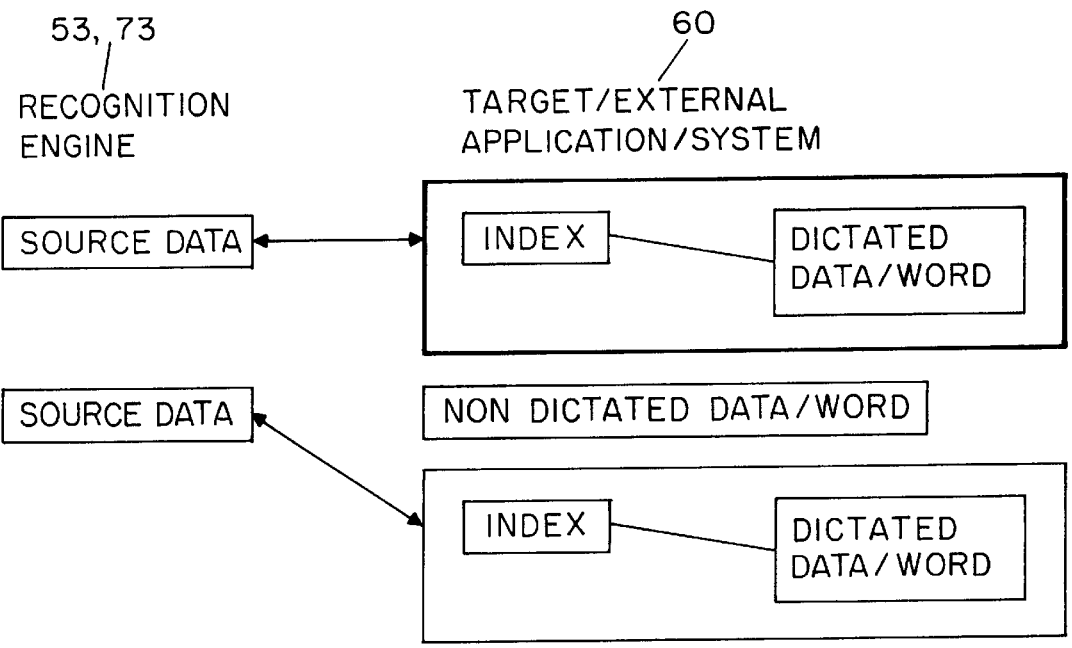
FIG. 7 shows a correspondence relationship between audio or other source data from the recognition engine 53, 73 and items in the word processing data file 60.

FIG. 7 shows the correspondence relationship between the recognition engine source data (e.g. audio file) and the application (e.g. word processor) data. In FIG. 7, on the right side there are shown two words which entered the word processor through the dictation, and each is tagged (contains an index value pointing back to the audio data). Between the two dictated words is a word which entered the word processor by typing or some other non-dictating means.

Those skilled in the art will appreciate that while the engine 52, tagger editor 62, and word processor 56 are shown as separate functional blocks in FIG. 2, in a sense they may be considered to be all in one physical element in the physical system. After all, a most convenient way to effectuate the functionalities shown is by means of a general-purpose microprocessor executing appropriate stored programs. In another sense these functionalities may be considered to be distinct physical elements. The microprocessor together with one body of executable code serves as the engine 52, the microprocessor together with a second body of executable code serves as the tagger editor 62, and the microprocessor together with a third body of executable code serves as the word processor 56. The bodies of executable code could just as well have been marketed separately or together without departing in any way from the invention and without detracting from its benefits.

The tagging arrangements according to the invention will now be discussed in some detail as implemented with commonly used commercially available word processors.

With Microsoft Word, the tag or index information is stored by means of what are referred to as "bookmarks". The bookmark stores the index in its name. This method of storing the index (tag) in the name of the bookmark is important. This information stored in the name also contains a unique identifier to keep it unique within the documents, because Microsoft Word requires that each bookmark be uniquely named. The actual index information is stuffed into a string which is then used as the name of the bookmark. The bookmark is placed around the word so that the user can maneuver within the document and tell the word processor to go to the next bookmark which, in this context, is simply the next dictated word.

It should be noted that in some instances the recognition engine may recognize an idiomatic expression composed of two or more words. In such a case, the playback of audio would be performed with respect to the entirety of the expression rather than with respect to individual words thereof. Alternatively, the user may define certain words which, when interpreted by the word processor, are expanded into larger expressions of words. In Microsoft Word, for example, such an expression is termed a "text macro" (i.e. the word is associated and expanded into more than one word). In this case, the bookmark will span the entire selection of text, that is, the entirety of the idiomatic expression or expanded expression. The bookmark is associated with the entire selection of words, not just the single word that was dictated.

Experience has shown that each application for which the benefits of the invention have been successfully provided turns out to have limitations in how these indexes (tags) can be stored with the associated words. As mentioned above, in connection with Microsoft Word, bookmarks are used. It turns out to be nontrivial, for some specific applications, to accomplish the embedding of these indexes. In the case of Microsoft Word, for example, there are specific constraints as to how the bookmarks are placed around the words; if the bookmarks are incorrectly placed then subsequent editing leads to unpredictable and potentially incorrect results. In particular, it is necessary to create the bookmarks in such a way that the first character of the word is before the start of the bookmark and the end of the bookmark wraps the last character of the dictated text/word/unit. For example, if square brackets are used to denote the start and finish of the. bookmark, the bookmark for "sample" is set up as "s[ample]". This provides for the possibility that the cursor might be placed to the right of the space before a dictated word, and ensures that any new typed text cannot end up inside the existing bookmark. This also provides for the possibility that the cursor is placed to the left of a space after a dedicated word,, and ensures that any typed text cannot end up in the bookmark of the previously dictated text/word.

In the case of Microsoft Word, a limitation presents itself. The maximum number of characters of all the bookmark names cannot exceed some finite number, approximately 65,000 characters. This restricts the total number of bookmarks that can be used within a Word document which can lead to a limitation of how many words can be dictated into a single document. What's more, the bookmark names within Microsoft Word must be unique. Stated differently, it is not permitted that there be two bookmarks with the same name.

It has been found to be advantageous to employ a particular way of naming the bookmarks to minimize the number of characters utilized in each bookmark, thus allowing a larger total number of bookmarks and thus a larger number of words which may be dictated into a document. A base 62 method is used to make a textual representation of the index, taking into account the limitation that in Microsoft Word only standard characters (A–Z, a–z, and 0–9) may be used in the bookmark name. The index is typically a numerical integer (base 10). This integer is converted to base 62, and the base-62 digits are mapped to the permitted character set (A–Z, a–z, and 0–9).

Another commonly employed word processor is AmiPro, and according to the invention, bookmarks are used for AmiPro as well, but are positioned differently. With Ami Pro, the first character(s) of the bookmark name identifies the size of the string for the intended position of the bookmark. In the case of a tagged word that is one character long, the bookmark is placed around the entirety of the word (e.g. "[a]"). If it is a two-character word the bookmark resides between the two characters (e.g. "a[ ]n"). For words with more than two characters, the bookmark resides after the first character of the word and before the last character of the word (e.g. "w[or]d"). With AmiPro, there is the requirement that no two bookmarks, may have the same name. AmiPro permits a wider range of characters in the bookmark names than does Microsoft Word, so that in AmiPro one could use a base 108 data type for naming the bookmark.

Another commonly used word processor is WordPerfect. In WordPerfect it is necessary to utilize what WordPerfect refers to as "third party code" (TPC) embedded into the text, as experience shows that in WordPerfect 6.1, bookmarks do not work reliably for the needs of the invention. The TPC data structure embeds information about the length of the dictated unit of text, its index which is the pointer back to the original audio data from the recognition engine 52, and the size or span of the item of third party code. The size of the item of TPC, a parameter that corresponds to the character width of a bookmark, is important and is required to correspond to the width of the dictated word. This ensures that characters that are truly from the recognition engine are selected during correction, and that characters that are not from the engine (e.g. characters typed with the keyboard or other means) are not selected during correction. The item of TPC resides between the first and second character of the start of any dictated segment of text, so that in the word "sample" the item of TPC (denoted by "[TPC]") is positioned as "s[TPC]ample". In the special case of a one-character word then the item of ITPC resides directly after the word.

Many commonly used word processors permit what is called "hidden text" to be embedded in visible text that is being edited. The question naturally arises whether the "hidden text" capability of a particular word processor could be used as a place where recognition engine audio data tags could be placed. This is workable only if several conditions are satisfied: (1) there has to be a way to keep hidden text undisplayed for the user, and (2) if visible text is selected and copied or moved or pasted, the hidden text has to come along with the visible text. It turns out, however, that some applications such as Microsoft Word only select hidden text if the hidden text is displayed. This prevents the user from moving the dictated text and maintaining a hidden word tag for recognition purposes according to the invention.

Those skilled in the art will appreciate that given the teachings and benefits of the invention, it is reasonable to consider whether the use of OLE (object linking and embedding) objects would permit tagging recognized text with tag information that can be used in accordance with the invention. Such a consideration follows from the fact that OLE allows the programmer to define an OLE object containing the dictated text and other information corresponding to the tag and index information described above. Word tags can thus be used with embedded OLE objects for yet another method of implementing this invention where bookmarks, third party code, hidden text, or other methods could not be used because it or they are not supported in a particular application. An OLE object can be implemented as a data structure that contains the data object that was generated by the speech recognition engine for the recognized word, and in that structure it contains the data object and an index or other data that points to the original source of the data object.

Figure 8:
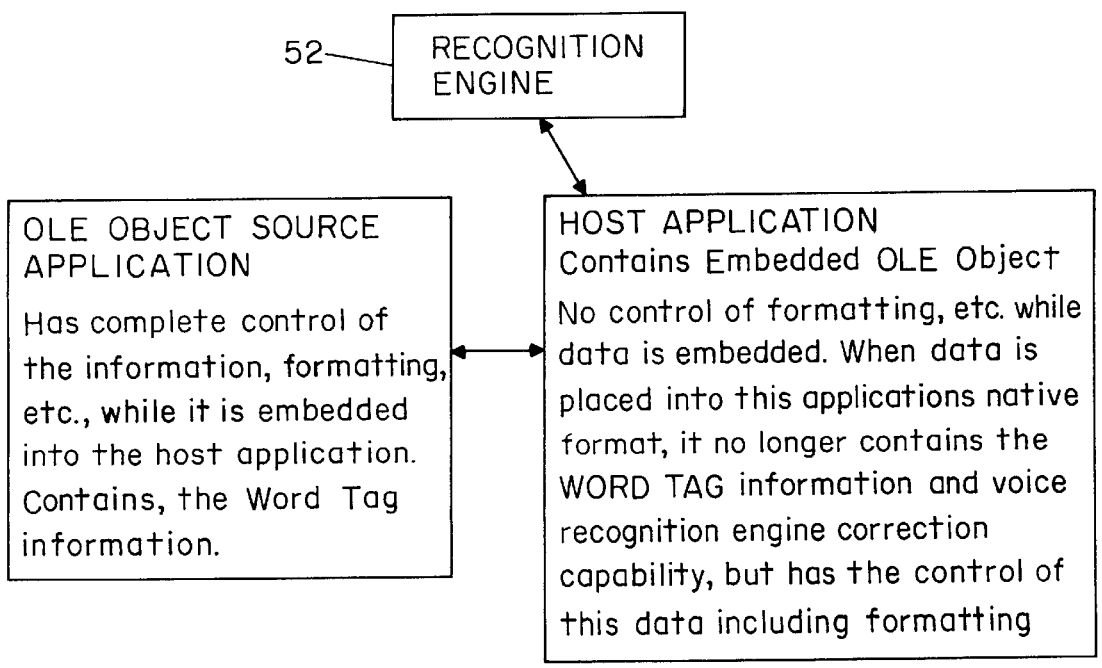
FIG. 8 shows operative connections between a recognition engine, a host application, and an OLE object source application according to the invention, all shown in functional block diagram form.

The use of OLE objects is not completely satisfactory, however, for the reason that an object can only be edited by the application that owns the object, in this case the speech recognition engine itself or some application receiving the speech recognition information and creating the tagged objects, as shown in FIG. 8. Thus, such objects are not editable, say, by a conventional word processor. Of course, the objects can be converted to the native format of the,word processor, but once this conversion is performed the tag information is lost. Stated differently, the moment that the user makes the text a native part of the host (e.g. word processor) application, all tag information and the associated benefits are lost. The speech recognition correction and editing capabilities, as well as updating of the user profile and audio, are no longer available at that point.

Despite this limitation, if appropriately programmed, the speech recognition engine could be used to edit a specific word or set of words and actually to dictate over those words. The newly dictated words would become embedded OLE objects and would have the word tags and associated benefits according to the invention, until they are made a native portion of the host/destination application (e.g. the word processor).

Figure 3:
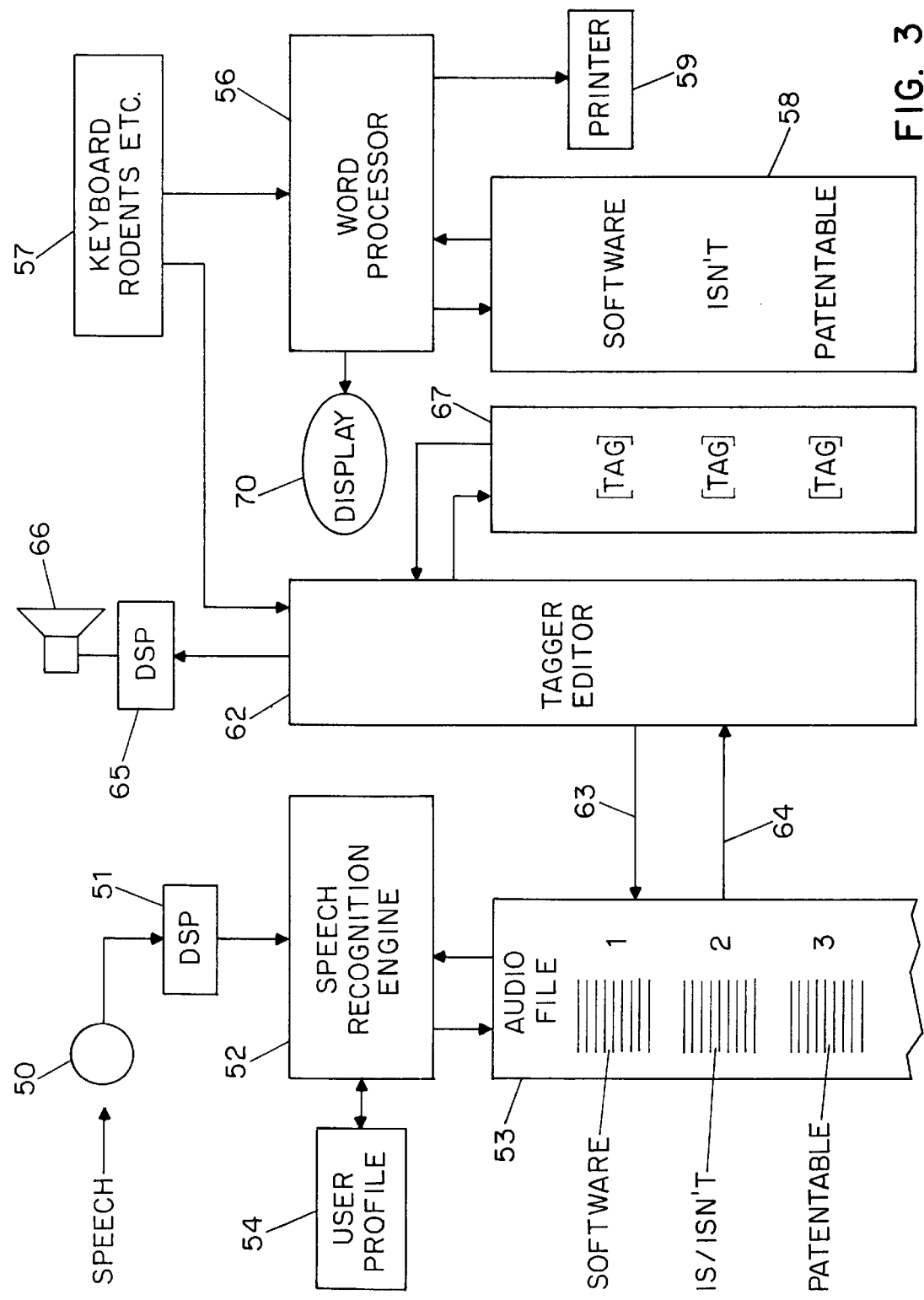
FIG. 3 shows in functional block diagram and data-flow fashion a second system using a speech recognition engine and a word processor together with tagging and editing capabilities according to the invention.

Yet another embodiment of the invention is termed a "mirrored" approach. With this approach the mirrored application running in the background completely duplicates every edit and every change implemented in the host application (the word processor). The need for this is strictly for applications that could not or do not support bookmarks, third party codes, hidden text, and embedded OLE objects or any other means of tagging, and still need to provide the benefits of the invention. This approach requires that everything occurring in the host application be duplicated, including window size, scroll, etc. This utilizes a background hidden window 67, shown in FIG. 3, that mirrors the focused application 56. This requires, of course, that the designer of the mirror application 62 know where the fields are in the host application that are to be set up with tags to correspond to recognized words. It is necessary to track every change made to the foreground (host application) window (screen 70, representing word processor file 58) in the background window 67 (in the mirrored application). Such an approach has numerous drawbacks, of course, not the least is system overhead.

Once the effort is made to include recognition tags embedded in the recognized words, other benefits come along with little extra difficulty. Those skilled in the art will appreciate that the information provided by the speech recognition engine for each recognized word (and alternate words, if provided) can be statistically analyzed. In particular, the recognition engine can provide a "score" indicative of the confidence level assigned by the engine to a particular recognition of a particular word. According to the invention, these "scores" are analyzed. The invention utilizes the knowledge that these scores change as words are regularly used and as the user profile is updated (changed to reflect the users use of specific words and word combinations, and a users pronunciation of words).

Figure 9:
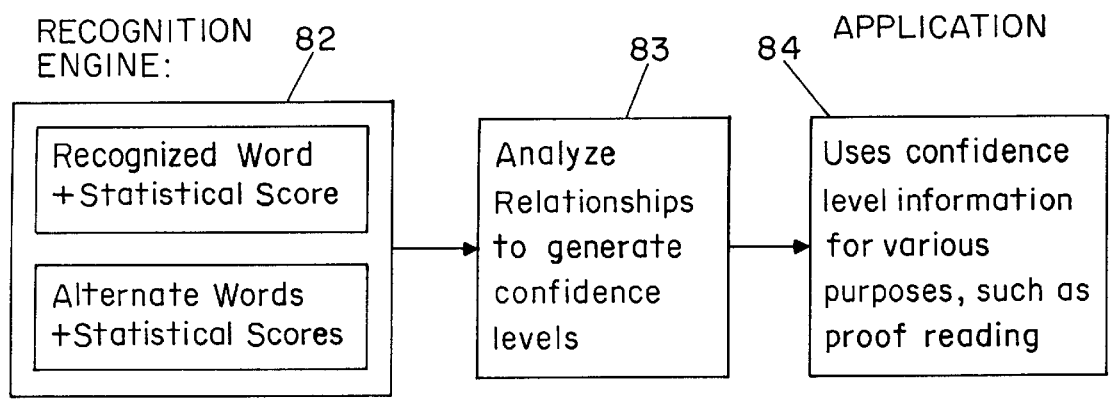
FIG. 9 shows a data flow relationship starting with the recognition engine 82, proceeding to an analysis functionality 83, and yielding application benefits 84.

According to the invention, the system analyzes the pattern of scores for both the recognized word and the alternate words generated by the recognition engine, as shown in FIG. 9. (If only the information for the recognized word were used, the analysis would be substantially lacking in accuracy and would be far less useful).

Figure 10:
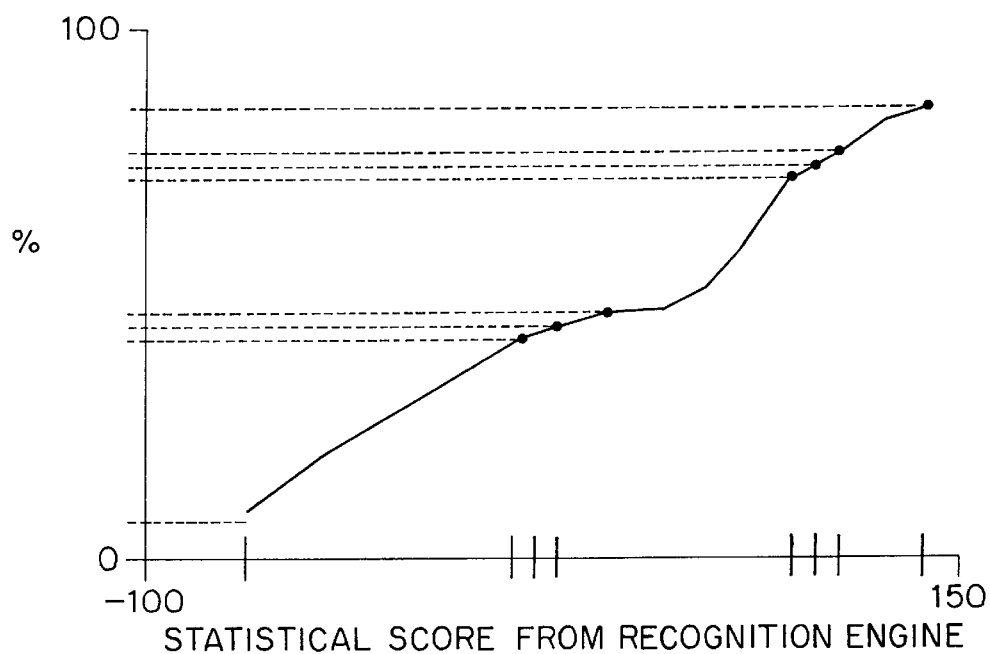
FIG. 10 shows an exemplary range of statistical scores from a recognition engine converted into a statistically significant confidence level, in graphical form.

For example, if a particular recognition yields a "best choice" word with a high engine score, and if the alternate words have significantly lower scores, this indicates a high probability of accurate recognition (high confidence level) from the recognition engine. The closer the scores of alternate words associated to the "best choice" recognized word, then the lower the probability that the word was correctly recognized. The more words that are closer in score to the recognized word then the more likely it was incorrectly recognized. FIG. 10 illustrates this concept.

An additional aspect of the invention based on the confidence level information puts the information generated from the confidence level information to use. The confidence level information is applied to the proofreading process for correction of a dictation document within an application, reflecting the need to separate words/text/data based on the confidence level of each recognized word. This can be used to allow an application to only correct words of a specific confidence level or range of confidence levels. This proofreading based on confidence level can be implemented in several ways. For instance, one may program the system to automatically question words which fall below a certain confidence level, so that they may be corrected. The application can restrict the system from displaying words of a particular confidence level, or within a specific confidence level range. Words with a specific confidence level or range may be displayed in a different color from the other text/data being displayed. Similarly, one can establish that words in various colors represent various confidence levels or ranges of confidence levels. In addition, an array can be added for each word that stores the associated confidence levels and the associated alternate words and their confidence levels so that the proofreading is updated after a word is changed and once a word is corrected, that corrected word shows a confidence level of 100 percent for that particular correction session/document.

Another embodiment of the invention involves forcing a recognition engine into a specific mode that constrains the recognition process for information that is limited to a specific area of an application.

Figure 5:
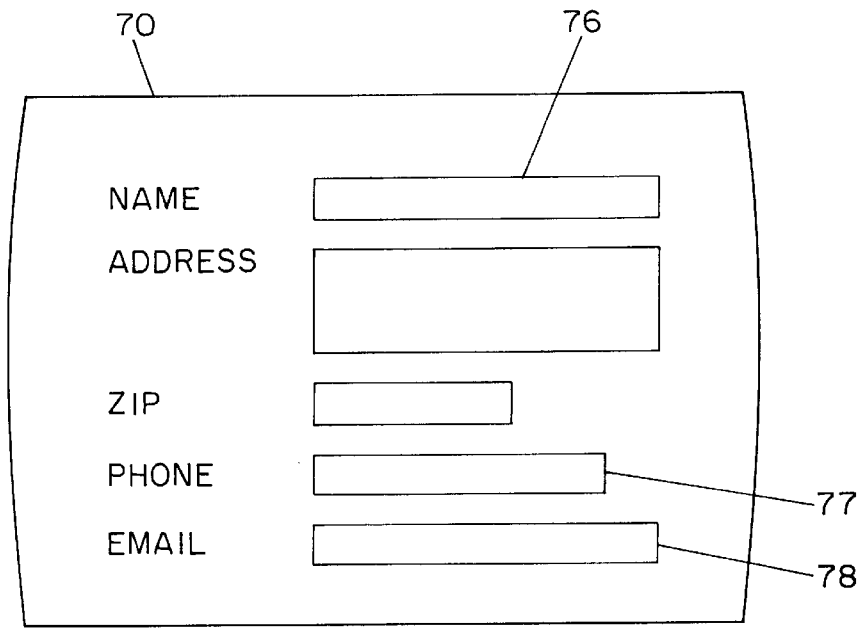
FIG. 5 shows a typical word processor or other application screen with defined areas in which recognition is constrained to particular narrow vocabularies, thereby enhancing the quality of the resulting edited recognized text.
Figure 11:
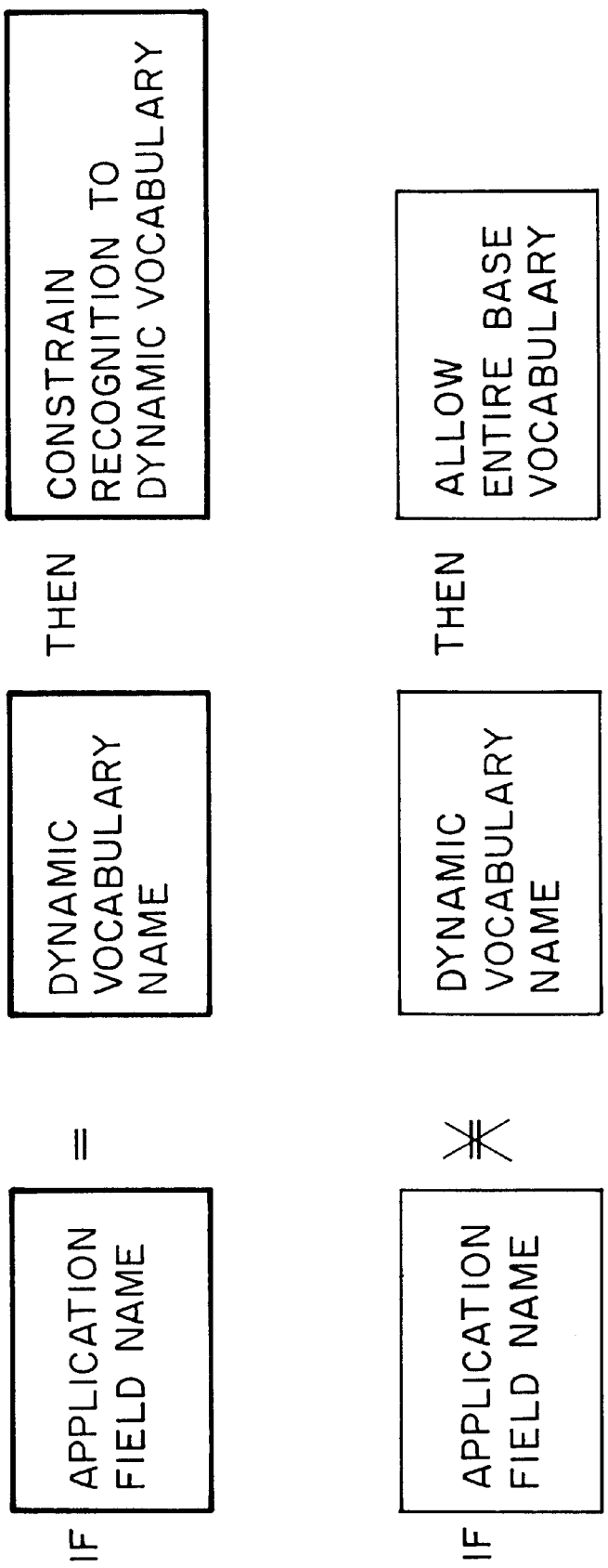
FIG. 11 shows logical conditions leading to vocabulary constraints or the absence of vocabulary constraints, depending on the application field being handled at a particular time.

Referring to FIG. 5, consider an area 77 of an application where one wishes only to recognize or input numbers. According to the invention, the application dynamically switches to a vocabulary that only has numbers 0 through 9 (or, in some cases, only certain digits). In an embodiment of the invention, one simply establishes a dynamic vocabulary named as the same name of a particular field or defined area within an application. As shown in FIG. 11, this means that when the focus of the application is in an area that has a designation that is the same name as the name of a specific dynamic vocabulary the system will automatically know to switch to that vocabulary and constrain the recognition process to just that vocabulary and for others that may be identified within that vocabulary. For instance, it may also indicate that the entire base vocabulary of the particular engine is also available in addition to the specific constrained vocabulary. Another aspect of this invention is that some applications do not provide information about areas within the application window, so that it is unknown as to whether or not the recognition process should be constrained since the application does not provide any identifying information for that area of the screen or window within the application. According to the invention, a specific area is defined in an applications window and a specific identification for that window is associated so that when the focus (carat) is in that area, it is associated with the name of that area.

With speech recognition, word are always spelled correctly, but are not always recognized correctly. Correcting is the most time consuming part of typing and dictating. With prior art speech recognition systems it is generally necessary to do correction at the time of dictation. The present invention offers the prospect of "deferred correction". The dictation could take place one day, from one user, and the correction could take place the next day, performed by a different user, if the tagging and playback functionality of the invention is provided.

Deferred correction is possible because the system saves text, associated audio and recognition engine information for later correction and user profile updating. Deferred correction allows anyone to dictate a document and correct it with the recognition process anytime, not just at the time of dictation as required by other systems. A first person (with a personal user profile) could do the dictating and a second person could do the corrections, updating the user profile of the first person. The updating can be done with respect to words correctly recognized as well as words that were not correctly recognized (and were thereafter corrected by the second person). The present invention is the key to allow this to work, because without it, one could not play back the audio associated with a word, nor update a user profile after having saved the dictation session and reopen the file at a later time. With the invention, one may dictate, save the dictation session (with the text and tagging and stored audio information), and at a later time, correct the recognition, playing back the audio associated with a word, and updating a user profile.

Another aspect of the invention relates to the manner in which the dictated voice gets into the system.

In most speech recognition systems there is an initial session, called a "registration session" or an "enrollment session", during which the user recites (dictates) a standard text passage into the system. Information is extracted from the received audio, by which the system "learns" about the characteristics of the user's voice. This information forms part of a "user profile" that is used to assist in recognizing other speech of the user.

Traditionally people wanting to dictate have been in the habit of using handheld and desktop recorders; most commonly nowadays people use microcassette recorders, although digital tape recorders are coming into use. When the technology to utilize computers to recognize speech and voice became available during recent years, this presented a quite diffe nt user interface, namely the user sitting in front of the computer and speaking into a microphone. Efforts have been made to set up a system in which the user dictates into a recorder, and in which the recorded audio is played back into the computer that performs the speech recognition. That has not worked well. Analog recorders do not work well for this purpose, but even if i digital recorder is used (without the teachings of the present invention) it does not work well, for reasons that will now be described.

In accordance with the invention, a digital recorder can be used to achieve recognition accuracy equivalent to that achieved when dictating directly into a speech recognition system. The format of the recording is not important, experience has shown, so long as it is a digital recording. It has been found that a digital recording system with eight-bit recording technology is acceptable, although sixteen-bit or greater resolution is beneficial to obtain the highest levels of accuracy. The sampling rate can also be an important factor but is related to the speech recognition system's requirements. A crucial aspect to this invention is the "batch" processing of the recorded audio for speech recognition purposes. as will be discussed.

One of the main problems with the use of recorders is associated with the limitations of the current technology. These limitations are:

the need to enroll with the input device that will be used;

the need (with some engines) to have the user correct the dictated text at the point in time that it was misrecognized during the transcription process;

the need for a consistent audio level input and characteristic. To achieve the highest accuracy, current engines require a specific type of microphone and a consistent distance between the microphone and the sound source.

Stated differently, if the user enrolls by speaking into a microphone that is attached to the speech recognition system, and if the user later dictates into a handheld recorder (which necessarily has a different microphone and different audio processing circuitry and acoustics) then the recognition does not go well.

Figure 12:
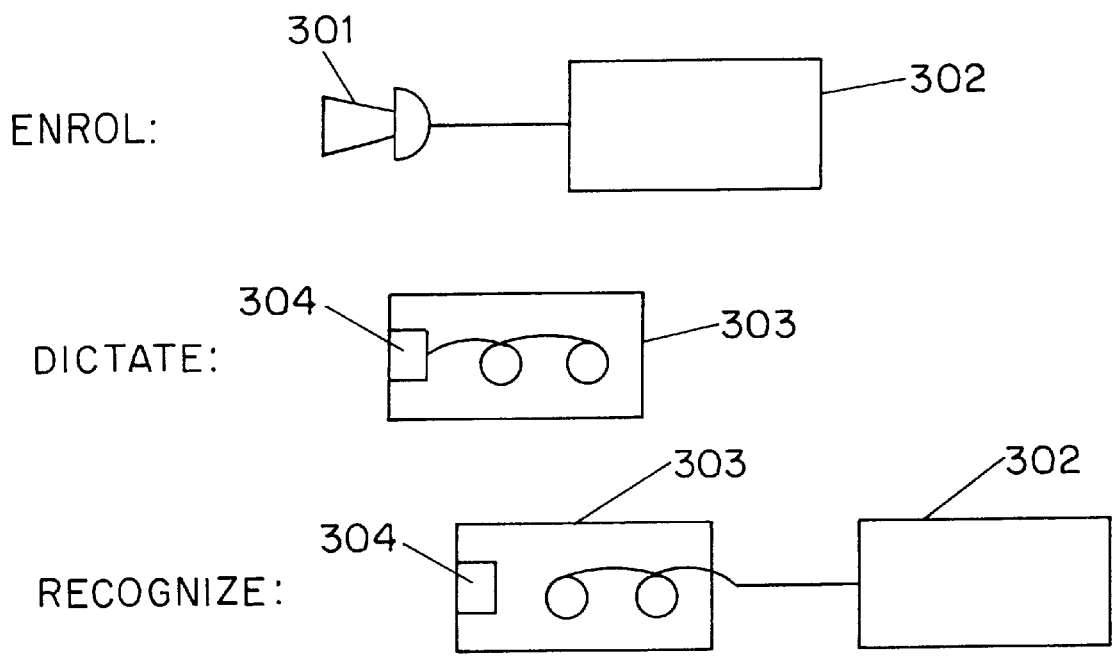
FIG. 12 shows a functional block diagram of a prior art speech recognition system.

In accordance with the invention, a passthrough circuit is utilized so that the user can enroll into the recognition system using the recorder. This allows the system to learn the sound characteristics of the specific user as it is recorded from the recorder and played back. Referring now to FIG. 12, the prior art way of enrolling and dictating and recognizing is shown. Enrollment is done with a microphone 301 that is connected to the speech recognition system 302. Later, the user dictates into a recorder 303 which has an integral or associated microphone 304. The dictated audio information is stored on tape in the recorder 303. Later still, the tape is played back from the recorder 303 to the recognition system 302. This presents difficulties since the acoustical qualities of the microphone 301 differ from those of the microphone 304, and the audio signal paths are not the same.

Figure 13:
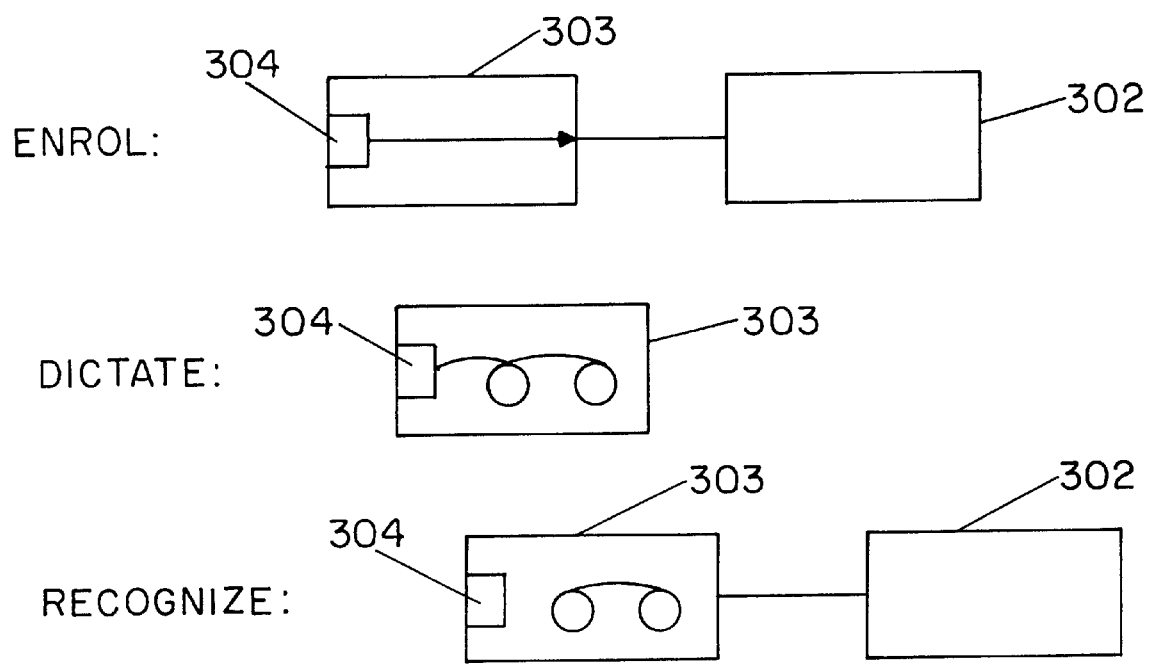
FIG. 13 shows a functional block diagram of the speech recognition system according to the invention.

In accordance with the invention, on the other hand, as shown in FIG. 13, the recorder 303 is connected with the recognition system 302 for enrollment. The user dictates the standard text into the microphone 304, and the audio (in addition to or instead of being recorded on the tape) is passed through to the recognition system 302. The enrollment process continues until it is finished. (It will be appreciated that with many speech recognition systems the enrollment process requires various keyboard and display screen interactions with the user.)

Later, the user dictates into the recorder 303.

Still later, the recorder 303 is played back into the speech recognition system 302.

It will be appreciated that this arrangement is far superior to prior-art arrangements for enrollment and tape-recorded dictation that is to be speech-recognized. It will also be appreciated that this superior result obtains regardless of the particular speech recognition engine being used. No matter what engine is used, the engine does its job better if the audio path for enrollment is nearly the same as the audio path for later recognition.

Another aspect of the invention involves the realization that, for efficient use, the recognition engine and interface must allow the user to transcribe the dictated text in what is referred to as a "batch" mode relative to correction. What this means is that the user is allowed to make corrections after the entire transcription/recognition process for that recording has been completed.

Another aspect of the invention will now be discussed. If the user speaks into a digital tape recorder for later playback and recognition, then it might be thought preferable to perform the transfer from the recorder to the computer digitally rather than in an analog fashion. With present technology, however, experience suggests that the best implementation of this is via a traditional analog inputs into the recognition engine. In some cases the input will be into the microphone input of the speech recognition system and in others it will be into the line input of the speech recognition system. It was also found that in virtually all cases the specific output level from the recorder had to be adjusted to meet the input needs of the recognition engine hardware used for digitizing the incoming audio signal. In some cases it was found that the system required additional external level control.

This invention could also be used with traditional analog recorders, however the long-term use of the analog recorders results in some deterioration due to the nature of analog tape distortion and changes over time. The deterioration of analog recorder heads as they wear down and become dirty introduces unacceptable changes in the audio consistency.

With the use of digital recorders and also analog recorders in conjunction with voice recognition a crucial part of this invention involves the discovery that the recorder must be able to accept a microphone of suitable quality required by the specific recognition engine a, an external plug-in microphone to the recorder. Should the recorder have a built-in microphone it is possible to use this, however, it was found that to ensure accurate recognition using the built and microphone the use of what is termed an "autogain" circuitry associated with the built-in microphone and output level of the recorder is essential. This is associated with the current nature of voice recognition systems which require a consistent level input and consistent distance of the microphone from the mouth of the person dictating. A key finding is that the hand-held microphone and the embedded microphone on a hand-held recorder can be used effectively only if the recorder and or microphone contains special automatic gain circuitry to ensure a consistent recording level. It should be emphasized that the system according to the invention allows equivalent recognition accuracy to the results of having a microphone directly connected into the recognition hardware for enrollment and dictation. Prior art systems using recorders in the recognition process found substantially lower recognition rates in all cases that averaged 30 to 50% below the recognition rates from dictating directly into the recognition engine hardware.

In contrast, in the system according to the invention, the interjection of a recorder between the user and the recognition engine does not give rise to a 30–50% degradation as in prior art systems, but instead gives identical recognition accuracy to that of going directly into the recognition engine hardware.

As mentioned above it has been found desirable to use an automatic gain control functionality with the microphone into which the user dictates. This will now be discussed in some detail.

With voice recognition systems/processes there is a problem with input levels that vary significantly. Because of this, prior art recognition technologies require the use of a fixed-position microphone, typically a headset or ear-mounted microphone that keeps the microphone element at a consistent distance away from the audio source (such as the mouth of the user). This prevents the use of hand-held devices since it is impossible to maintain a consistent distance. Indeed if the microphone is in one position during enrollment and in a different position, as little as one or two inches away, during dictation, a much poorer recognition accuracy results. The same problems present themselves if stationary desktop or wall-mounted microphones are used. Though these microphones may work, the issue is the level of recognition achieved using microphones that may have a tendency to have a varying distance between the microphone element and the audio source.

In accordance with the invention, well-known autogain/autolevel control circuitry is utilized to compensate for variations in the distance between the microphone elements and the audio source. With the use of autogain/autolevel control circuitry it is possible to achieve accuracy levels comparable with those achieved with the standard microphones used with a voice/speech recognition engine. The actual circuit design is not part of this invention, since there are a wide variety of well-known autolevel and automatic gain control circuits that can achieve this affect.

The primary issue is to design circuitry and/or software that minimizes distortion of the audio signal and minimizes electronic noise while maintaining a consistent recording and/or input level to the recognition system. This is implemented in any of the following ways:

adjusting the recording level of the recorder
  adjusting the playback level of the recorder
  adjusting the input signal within the speech recognition system and/or using an external system for adjusting, or pre-processing of the audio gong to the speech recognition system.

Yet another aspect of the invention relates to the manner in which the system recognizes that an utterance is a command rather than a word to be recognized and provided as text to the word processor or other application.

The use of voice/speech recognition presents unique problems associated with interpreting the spoken word relative to commands versus dictated words. Traditionally, the problem was solved by having a user change the method of speaking that allowed the recognition process to interpret a command. For example, with discrete dictation engines, any word dictated discretely is recognized as a dictated word, while in a dictation mode, any combination of words such as "STOP DICTATION", spoken as a single word (e.g. "STOPDICTATION") is, recognized as a command. Other implementations used mode changes to toggle the recognition process from one mode to another. One problem with mode selection is that users would forget what mode they were in. The problem becomes even more difficult with continuous speech/voice recognition engines, since they cannot distinguish between the method of speaking, since all dictation is continuous.

In accordance with the invention, hardware switches can be utilized to send the recognition engine information about the nature of the words being dictated while the switch is active. It is preferable that the switch function only when activated, meaning that it is not a toggle but a continuous switch. For instance with the foot-switch implementation of the invention, whenever the foot pedal is depressed the engine may be constrained to only recognizing words as "format commands". The invention is not limited to the type of hardware switch or the type of command or mode which the engine is switched to while the switch is depressed.

Suitable switches used in this way can include keyboard key(s), mouse button(s), foot pedal(s), wireless switch/controller, or remote controller. These may be plugged into a serial, parallel, keyboard or other system interface. The particular type of switch used is not critical.

Still another aspect of the invention will now be described.

The use of audio recorders, whether analog or digital, presents some unique problems associated with speech/voice recognition systems/processes. Since the user does not see the results of the dictation while recording, any mis-recognized commands are not known.

This aspect of the invention involves embedding of a marker into a recorded audio stream, that can later be interpreted by the recognition system and or other external device 3 and interpreted to determine the nature of the embedded signal. The exact nature of the signal is, not critical. Such a marker may be an audio signal or embedded information in a digital file which is interpreted by the recognition system or an external system which instructs the recognition system to respond in a particular manner, for example to recognize something as a command instead of a dictated word.

While recording, the user presses a button or some other switch (e.g. a keyboard key, mouse movement, or other button that activates a tone device, such as a modem or similar tone (or embeds information into the digital audio file) to indicate to the recognition system that an action must be taken. For example, the tone (or embedded command) may indicate that what follows should only be recognized as a command, while another button would insert a different tone (or embedded command) that would be interpreted by the recognition system as a command that what follows should be recognized as dictation. The possible number of distinct tones (or embedded commands) is virtually unlimited though from a practical standpoint only a few tone (or embedded command) controls would be utilized, in order to simplify the process and prevent confusion.

Upon playback of the recorded audio into the speech recognition system, the tones (or embedded commands) are analyzed by the recognition system and/or a device connected 1o the serial port (or other interface such as the keyboard or parallel port) of the computer/system. In one embodiment, one audio channel, for example the left audio channel, contains the audio tone while the right audio channel contains the recorded dictation. For systems that record a digital audio file the information could be embedded into the file and the recognition system, or external pre-processor, would read the digital audio file and invoke the associated embedded command(s) by the recognition engine.

An optional enhancement to this arrangement is that when the button, or other device, that was pushed/activated to represent a command mode, then the playback sound could say "COMMAND MODE".

This aspect of the invention is helpful with any batch processing of recorded audio or system where visual interaction with the speech recognition system is not possible, for the purpose of speech/voice recognition (voice-to-text and/or commands).

Those skilled in the art will have no difficulty devising variations and changes to the embodiments given herein which in no way deviate from the invention, as defined by the following claims.

We claim:

1. An apparatus for editing text resulting from speech recognition, said apparatus comprising an audio file, a word processing file, a word processor, and a playback facility, the playback facility further comprising a speaker:

the audio file comprising audio information;

the word processing file comprising text words and tag information for each of the text words, the tag information linking text words to respective audio information;

the word processor having user inputs and operatively coupled with the word processing file and disposed to select ones of the text words and tag information at a first location; the word processor responsive to a first user input for copying selected text words and tag information, and responsive to a second user input for inserting said selected text words and tag information into the word processing file at a second location differing from the first location;

the word processor further responsive to a third user input for selecting ones of the text words and tag information at the second location;

the apparatus further comprising a playback facility responsive to a fourth user input and to the selected tag information at the second location, for identifying audio information in the audio file linked to the text words selected at the second location, and for playing back the audio information via the speaker.

2. The apparatus of claim 1 in which the tag information comprises bookmarks, each bookmark comprising a unique identifier, a portion of the identifier defining the link to respective audio information, each bookmark disposed to begin after the first character of its corresponding word, and disposed to end after the last character of its corresponding word.

3. The apparatus of claim 1 in which the tag information comprises third party code, each item of third party code comprising information about the length of the respective dictated unit of text, information defining the link to respective audio information, and information defining the length of the item of third party code.

4. The apparatus of claim 1 in which the tag information comprises a bookmark, with a first character of the bookmark identifying the size of the string for the intended position of the bookmark.

5. The apparatus of claim 1 in which the word processor comprises a means for storing hidden text in the word processor file, and in which the tag information comprises hidden text.

6. The apparatus of claim 1 in which the word processor comprises a means for manipulating OLE objects, and in which the text words and respective tag information together comprise OLE objects.

7. The apparatus of claim 1 further comprising a microphone and a speech recognition engine, the speech recognition engine operatively coupled with the microphone and operatively coupled with the audio file for receiving speech at the microphone and storing audio information indicative of the speech in the audio file, the speech recognition engine further operatively coupled with the word processor for provision of recognized text words from the speech recognition to the word processor.

8. The apparatus of claim 7 in which the speech recognition engine further comprises a user profile file storing information relating to a user's speech, the user profile used by the speech recognition engine for recognition of speech by the user, and in which the apparatus further comprises updating means responsive to a fifth user input for updating the user profile file subsequent to playback of the audio information via the speaker.

9. An apparatus for editing text resulting from speech recognition, said apparatus comprising an audio file, a word processing file, a word processor, and a playback facility, the playback facility further comprising a speaker:

the audio file comprising audio information;

the word processing file comprising text words and tag information for each of the text words, the tag information linking text words to respective audio information;

the word processor having user inputs and operatively coupled with the word processing file and disposed to select ones of the text words and tag information at a first location; the word processor responsive to a first user input for copying and deleting selected text words and tag information, and responsive to a second user input for inserting said selected text words and tag information into the word processing file at a second location differing from the first location;

the word processor further responsive to a third user input for selecting ones of the text words and tag information at the second location;

the apparatus further comprising a playback facility responsive to a fourth user input and to the selected tag information at the second location, for identifying audio information in the audio file linked to the text words selected at the second location, and for playing back the audio information via the speaker.

10. The apparatus of claim 9 in which the tag information comprises bookmarks, each bookmark comprising a unique identifier, a portion of the identifier defining the link to respective audio information, each bookmark disposed to begin after the first character of its corresponding word, and disposed to end after the last character of its corresponding word.

11. The apparatus of claim 9 in which the tag information comprises third party code, each item of third party code comprising information about the length of the respective dictated unit of text, information defining the link to respective audio information, and information defining the length of the item of third party code.

12. The apparatus of claim 9 in which the tag information comprises a bookmark, with a first character of the bookmark identifying the size of the string for the intended position of the bookmark.

13. The apparatus of claim 9 in which the word processor comprises a means for storing hidden text in the word processor file, and in which the tag information comprises hidden text.

14. The apparatus of claim 9 in which the word processor comprises a means for manipulating OLE objects, and in which the text words and respective tag information together comprise OLE objects.

15. The apparatus of claim 9 further comprising a microphone and a speech recognition engine, the speech recognition engine operatively coupled with the microphone and operatively coupled with the audio file for receiving speech at the microphone and storing audio information indicative of the speech in the audio file, the speech recognition engine further operatively coupled with the word processor for provision of recognized text words from the speech recognition to the word processor.

16. The apparatus of claim 15 in which the speech recognition engine further comprises a user profile file storing information relating to a user's speech, the user profile used by the speech recognition engine for recognition of speech by the user, and in which the apparatus further comprises updating means responsive to a fifth user input for updating the user profile file subsequent to playback of the audio information via the speaker.

17. An apparatus for editing text resulting from speech recognition, said apparatus comprising an audio file, a word processing file, a mirror file, a word processor, a mirror application, and a playback facility, the playback facility further comprising a speaker:

the audio file comprising audio information;

the word processing file comprising text words;

the mirror file comprising tag information for each of the text words, the tag information linking text words to respective audio information;

the word processor having user inputs and operatively coupled with the word processing file and disposed to select ones of the text words at a first location; the word processor responsive to a first user input for copying selected text words, and responsive to a second user input for inserting said selected text words into the word processing file at a second location differing from the first location;

the mirror application responsive to the user inputs and operatively coupled with the mirror file and disposed to select ones of the tag information corresponding to the text words at the first location, the mirror application responsive to the first user input for copying tag information corresponding to the selected text words, and responsive to the second user input for inserting said tag information into the mirror file at a second location differing from the first location;

the word processor further responsive to a third user input for selecting ones of the text words at the second location;

the mirror application responsive to the third user input for selecting tag information corresponding to the ones of the text words at the second location;

the apparatus further comprising a playback facility responsive to a fourth user input and to the selected tag information at the second location, for identifying audio information in the audio file linked to the text words selected at the second location, and for playing back the audio information via the speaker.

18. The apparatus of claim 17 further comprising a microphone and a speech recognition engine, the speech recognition engine operatively coupled with the microphone and operatively coupled with the audio file for receiving speech at the microphone and storing audio information indicative of the speech in the audio file, the speech recognition engine further operatively coupled with the word processor for provision of recognized text words from the speech recognition to the word processor.

19. An apparatus for editing text resulting from speech recognition, said apparatus comprising an audio file, a word processing file, a mirror file, a word processor, a mirror application, and a playback facility, the playback facility further comprising a speaker:

the audio file comprising audio information;

the word processing file comprising text words;

the mirror file comprising tag information for each of the text words, the tag information linking text words to respective audio information;

the word processor having user inputs and operatively coupled with the word processing file and disposed to select ones of the text words at a first location; the word processor responsive to a first user input for copying and deleting selected text words, and responsive to a second user input for inserting said selected text words into the word processing file at a second location differing from the first location;

the mirror application responsive to the user inputs and operatively coupled with the mirror file and disposed to select ones of the tag information corresponding to the text words at the first location, the mirror application responsive to the first user input for copying and deleting tag information corresponding to the selected text words, and responsive to the second user input for inserting said tag information into the mirror file at a second location differing from the first location;

the word processor further responsive to a third user input for selecting ones of the text words at the second location;

the mirror application responsive to the third user input for selecting tag information corresponding to the ones of the text words at the second location;

the apparatus further comprising a playback facility responsive to a fourth user input and to the selected tag information at the second location, for identifying audio information in the audio file linked to the text words selected at the second location, and for playing back the audio information via the speaker.

20. The apparatus of claim 19 further comprising a microphone and a speech recognition engine, the speech recognition engine operatively coupled with the microphone and operatively coupled with the audio file for receiving speech at the microphone and storing audio information indicative of the speech in the audio file, the speech recognition engine further operatively coupled with the word processor for provision of recognized text words frond the speech recognition engine to the word processor.

21. A method of editing text resulting from speech recognition for use with an audio file, a word processing file, a word processor, a playback facility, and a speaker, the method comprising the steps of:

establishing, within the word processing file, text words and tag information for each of the text words, the tag information linking text words to respective audio information;

selecting ones of the text words and tag information at a first location;

copying the selected text words and tag information;

inserting said selected text words and tag information into the word processing file at a second location differing from the first location;

selecting ones of the text words and tag information at the second location;

identifying audio information in the audio file linked to the text words selected at the second location; and playing back the audio information via the speaker.

22. The method of claim 21 in which the tag information comprises bookmarks, each bookmark comprising a unique identifier, a portion of the identifier defining the link to respective audio information, each bookmark disposed to begin after the first character of its corresponding word, and disposed to end after the last character of its corresponding word.

23. The method of claim 21 in which the tag information comprises third party code, each item of third party code comprising information about the length of the respective dictated unit of text, information defining the link to respective audio information, and information defining the length of the item of third party code.

24. The method of claim 21 in which the tag information comprises a bookmark, with a first character of the bookmark identifying the size of the string for the intended position of the bookmark.

25. The method of claim 21 in which the word processor comprises a means for storing hidden text in the word processor file, and in which the tag information comprises hidden text.

26. The method of claim 21 in which the word processor comprises a means for manipulating OLE objects, and in which the text words and respective tag information together comprise OLE objects.

27. The method of claim 21 further characterized as being for use with a microphone and a speech recognition engine, further comprising the steps, performed before the establishing step, of:

receiving speech at the microphone;

storing audio information indicative of the speech in the audio file;

recognizing text words; and storing the recognized words in the word processor file.

28. The method of claim 27 further characterized as being for use with a speech recognition engine further comprising a user profile file storing information relating to a user's speech, the method further characterized in that the recognizing step uses information stored in the user profile file; the method further comprising the step of updating the user profile file subsequent to playback of the audio information via the speaker.

29. A method of editing text resulting from speech recognition for use with an audio file, a word processing file, a word processor, a playback facility, and a speaker, the method comprising the steps of:

establishing, within the word processing file, text words and tag information for each of the text words, the tag information linking text words to respective audio information;

selecting ones of the text words and tag information at a first location;

copying the selected text words and tag information;

deleting the selected text words and tag information at the first location;

inserting said selected text words and tag information into the word processing file at a second location differing from the first location;

selecting ones of the text words and tag information at the second location;

identifying audio information in the audio file linked to the text words selected at the second location; and playing back the audio information via the speaker.

30. The method of claim 29 in which the tag information comprises bookmarks, each bookmark comprising a unique identifier, a portion of the identifier defining the link to respective audio information, each bookmark disposed to begin after the first character of its corresponding word, and disposed to end after the last character of its corresponding word.

31. The method of claim 29 in which the tag information comprises third party code, each item of third party code comprising information about the length of the respective dictated unit of text, information defining the link to respective audio information, and information defining the length of the item of third party code.

32. The method of claim 29 in which the tag information comprises a bookmark, with a first character of the bookmark identifying the size of the string for the intended position of the bookmark.

33. The method of claim 29 in which the word processor comprises a means for storing hidden text in the word processor file, and in which the tag information comprises hidden text.

34. The method of claim 29 in which the word processor comprises a means for manipulating OLE objects, and in which the text words and respective tag information together comprise OLE objects.

35. The method of claim 30 further characterized as being for use with a microphone and a speech recognition engine, further comprising the steps, performed before the establishing step, of:

receiving speech at the microphone;

storing audio information indicative of the speech in the audio file;

recognizing text words; and storing the recognized words in the word processor file.

36. The method of claim 35 further characterized as being for use with a speech recognition engine further comprising a user profile file storing information relating to a user's speech, the method further characterized in that the recognizing step uses information stored in the user profile file; the method further comprising the step of updating the user profile file subsequent to playback of the audio information via the speaker.

37. A method for editing text resulting from speech recognition, the method used with an audio file, a word processing file, a mirror file, a word processor, a mirror application, a playback facility, and a speaker, the method comprising the steps of:

storing recognized text in the word processing file;

storing in the mirror file tag information for each of the text words, the tag information linking text words to respective audio information;

selecting ones of the text words at a first location;

copying the selected text words;

inserting said selected text words into the word processing file at a second location differing from the first location;

select ones of the tag information corresponding to the text words at the first location;

copying tag information corresponding to the selected text words;

inserting said tag information into the mirror file at a second location differing from the first location;

selecting ones of the text words at the second location;

selecting tag information corresponding to the ones of the text words at the second location;

identifying audio information in the audio file linked to the text words selected at the second location; and playing back the audio information via the speaker.

38. The method of claim 37 further characterized as being used with a microphone and a speech recognition engine, the method comprising the additional steps, performed before the first storing step, of:

receiving speech at the microphone;

storing audio information indicative of the speech in the audio file;

recognizing text words from the information in the audio file; and providing recognized text words to the word processor.

39. A method for editing text resulting from speech recognition, the method used with an audio file, a word processing file, a mirror file, a word processor, a mirror application, a playback facility, and a speaker, the method comprising the steps of:

storing recognized text in the word processing file;

storing in the mirror file tag information for each of the text words, the tag information linking text words to respective audio information;

selecting ones of the text words at a first location;

copying the selected text words;

deleting the selected text words;

inserting said selected text words into the word processing file at a second location differing from the first location;

selecting ones of the tag information corresponding to the text words at the first location;

copying the tag information corresponding to the text words at the first location;

deleting the tag information corresponding to the text words at the first location;

inserting said tag information into the mirror file at a second location differing from the first location;

selecting ones of the text words at the second location;

selecting tag information corresponding to the ones of the text words at the second location;

identifying audio information in the audio file linked to the text words selected at the second location; and playing back the audio information via the speaker.

40. The method of claim 39 further characterized as being used with a microphone and a speech recognition engine, the method comprising the additional steps, performed before the first storing step, of:

receiving speech at the microphone;

storing audio information indicative of the speech in the audio file;

recognizing text words from the information in the audio file; and providing recognized text words to the word processor.

41. A speech recognition method for use with a speech recognition engine having an enrollment mode and a recognition mode and with a digital tape recorder having a microphone, the method comprising the steps of:

operatively coupling the digital tape recorder with the engine;

configuring the digital tape recorder so that audio information received at its microphone is communicated via the operative coupling to the engine;

performing the enrollment;

disconnecting the recorder from the engine;

dictating into the microphone of the recorder thereby recording dictated audio information therein;

operatively coupling the recorder with the engine;

playing back the audio information from the recorder and communicating said information via the operative coupling to the engine; and recognizing the information within the engine.

42. The method of claim 41 wherein the recorder further comprises an automatic gain control circuit operatively coupled with the microphone whereby the information recorded and communicated external to the recorder is at a substantially constant signal level.

* * * * *